United States Patent
Yang et al.

(10) Patent No.: US 10,070,327 B2
(45) Date of Patent: Sep. 4, 2018

(54) CENTRALIZED CHANNEL CODING AND SHAPING FOR A MULTI-NODE RAN

(71) Applicant: Verizon Patent and Licensing Inc., Arlington, VA (US)

(72) Inventors: Jin Yang, Orinda, CA (US); William H. Stone, Doylestown, PA (US); Lee K. Tjio, Danville, CA (US); Matthew W. Nelson, Pleasanton, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 239 days.

(21) Appl. No.: 14/263,717

(22) Filed: Apr. 28, 2014

(65) Prior Publication Data
US 2015/0312803 A1  Oct. 29, 2015

(51) Int. Cl.
*H04W 24/04* (2009.01)
*H04L 1/00* (2006.01)
*H04W 24/08* (2009.01)
*H04W 24/02* (2009.01)

(52) U.S. Cl.
CPC ........... *H04W 24/04* (2013.01); *H04L 1/0014* (2013.01); *H04L 1/0078* (2013.01); *H04L 2001/0097* (2013.01); *H04W 24/02* (2013.01); *H04W 24/08* (2013.01)

(58) Field of Classification Search
CPC ..... H04W 24/02; H04W 24/04; H04W 24/08; H04W 16/14; H04W 88/085; H04L 1/00; H04L 25/08
See application file for complete search history.

(56) References Cited

U.S. PATENT DOCUMENTS

| | | | | |
|---|---|---|---|---|
| 2012/0213128 A1* | 8/2012 | Miyata | ............... | H04B 7/0426 370/277 |
| 2013/0040683 A1* | 2/2013 | Siomina | ........... | H04W 28/0236 455/517 |
| 2013/0286868 A1* | 10/2013 | Oyman | ............... | H04W 24/06 370/252 |
| 2013/0344909 A1* | 12/2013 | Davydov | ............ | H04B 7/0689 455/501 |
| 2014/0029465 A1* | 1/2014 | Nagata | ................... | H04B 7/024 370/252 |
| 2014/0066116 A1* | 3/2014 | Gao | ....................... | H04W 24/10 455/509 |
| 2014/0078934 A1* | 3/2014 | Hugl | ...................... | H04B 7/024 370/254 |
| 2014/0247749 A1* | 9/2014 | Kim | ....................... | H04B 7/024 370/252 |

FOREIGN PATENT DOCUMENTS

| | | | | | |
|---|---|---|---|---|---|
| JP | WO 2013054683 A1 * | 4/2013 | ......... | H04J 11/0053 |
| WO | WO 2013123671 A1 * | 8/2013 | ............ | H04B 7/024 |

\* cited by examiner

*Primary Examiner* — Ricky Quoc Ngo
*Assistant Examiner* — Stephen Nicholas Steiner

(57) ABSTRACT

A system may be configured to determine radio frequency ("RF") transmission error types associated with a group of channels. Each channel may be associated with a particular remote radio node ("RRN"), of a group of RRNs, and a user device. The system may further modify subsequent RF communications between the RRNs and the user device, on a per-channel basis, and based on the determined transmission error types associated with each channel.

20 Claims, 10 Drawing Sheets

CENTRALIZED CHANNEL CODING AND SHAPING FOR A MULTI-NODE RAN

BACKGROUND

User devices, such as cellular telephones, may connect to cellular networks via a radio access network ("RAN"). RANs may include base stations, which may serve as an interface between the user devices and the cellular network. Base stations may include one or more antennas, via which the base stations may wirelessly communicate with the user devices. Some RANs may make use of multiple remote radio nodes ("RRNs"), which may each transmit orthogonal versions of the same signal to user devices, in order to improve performance of the RANs.

DETAILED DESCRIPTION OF PREFERRED EMBODIMENTS

The following detailed description refers to the accompanying drawings. The same reference numbers in different drawings may identify the same or similar elements.

Some networks, such as cellular networks, may include one or more radio access networks ("RANs"), via which radio frequency ("RF") signals may be transmitted to and/or from user devices, such as cellular telephones. Some RANs may make use of multiple remote radio nodes ("RRNs"), which may each simultaneously transmit RF signals (e.g., orthogonal RF signals that carry the same data) to and/or from user devices. User devices with multiple-input/multiple-output ("MIMO") capabilities may be able to process the simultaneous RF signals in a manner that increases performance and signal quality, as compared to RAN architectures that do not make use of RRNs.

Due to factors associated with individual RF channels (e.g., distance of an RRN from a user device, structures and/or topography between the RRN and the user device, etc.) associated with each RRN, RF signals may become dispersed when received from the RRN by a user device. Thus, at any given time, the user device may receive multiple distorted versions of the same original RF signal that was transmitted by multiple RRNs. For example, due to the characteristics of a particular channel associated with an RRN, RF signals transmitted by the RRN may be delayed, portions of RF signals may be repeated, RF signals may be weakened, etc.

Techniques described herein may allow for adjustments to be made to RF signals transmitted by RRNs, in order to accommodate for characteristics of channels between RRNs and user devices. The adjustments may be made on a per-RRN and a per-user device basis, in order to ensure that each user device, that receives RF signals from a set of RRNs, receives an original intended RF signal (e.g., multiple non-dispersed versions of an RF signal that carry the same data).

Figure 1A:
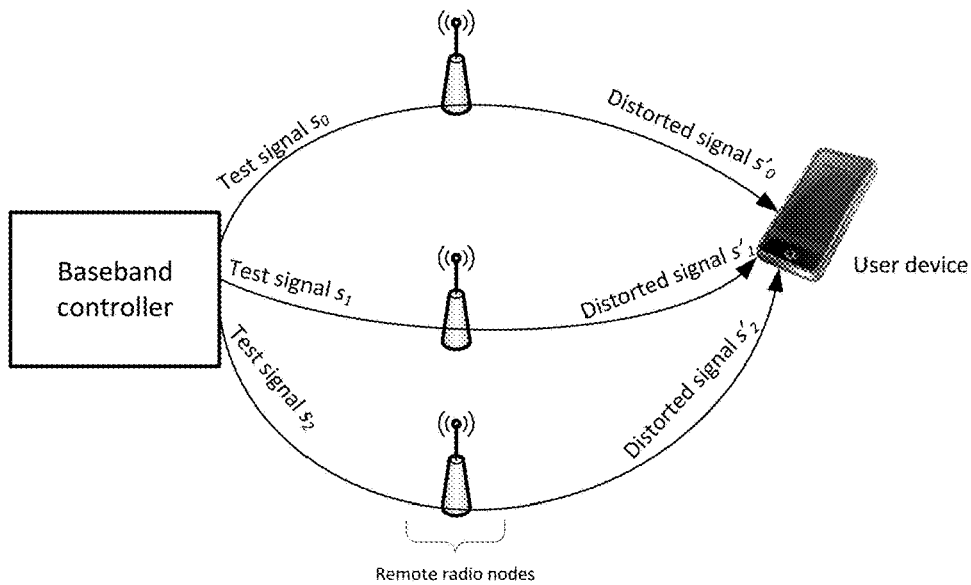
FIGS. 1A-1C illustrate an overview of one or more example implementations described herein.
Figure 1B:
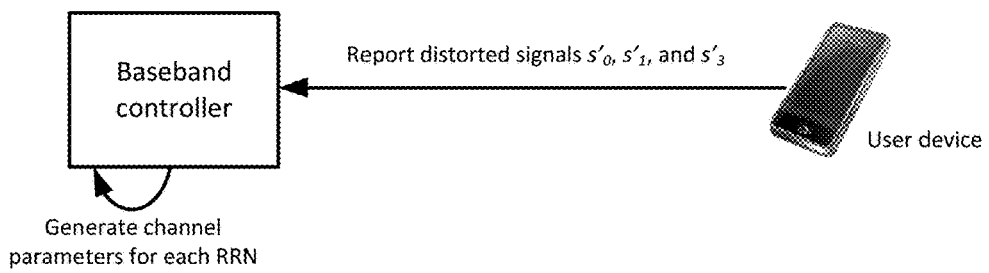
Figure 1C:
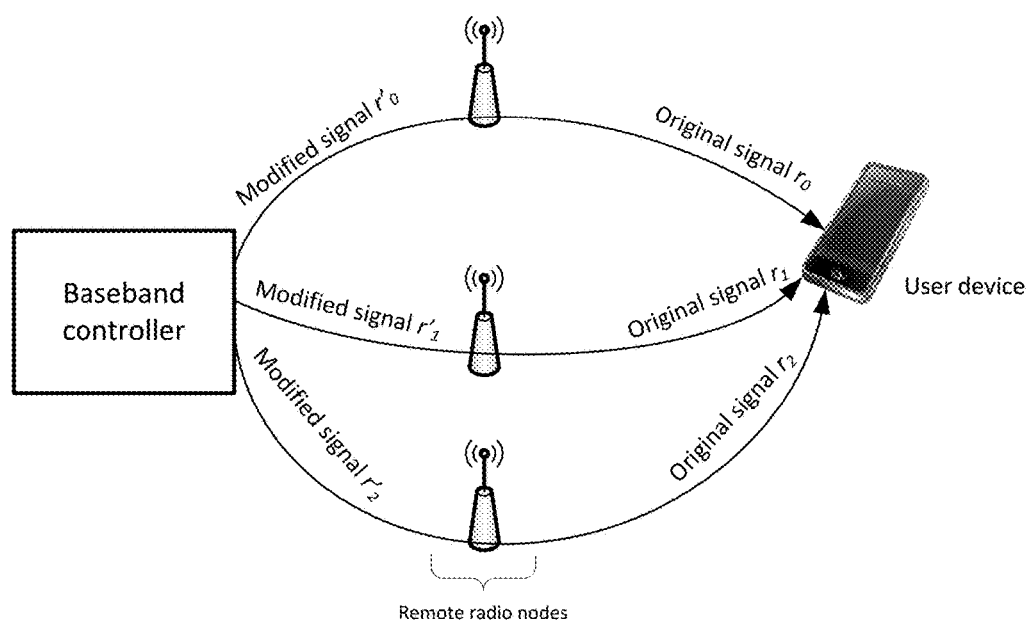

FIGS. 1A-1C illustrate an overview of an example implementation. In these figures, a baseband controller may be communicatively coupled to a set of three RRNs. The baseband controller may generally control the operation of the RRNs. For instance, the baseband controller may receive digital data that is to be sent to the user device, generate analog signals that carry the data (e.g., may perform a digital-to-analog conversion), and provide the analog signals to the RRNs, along with instructions to output the analog signals to the user device.

As shown in FIG. 1A, the baseband controller may output a set of test signals $s_0$, $s_1$, and $s_2$ to a user device via each of the three RRNs. These test signals may correspond to, for example, orthogonal signals generated by the baseband controller. Due to characteristics of channels between each RRN and the user device, channel dispersion may occur, and the user device may receive three distorted versions $s'_0$, $s'_1$, and $s'_2$ of the original test signals $s_0$, $s_1$, and $s_2$, respectively.

As shown in FIG. 1B, the user device may provide (e.g., via one or more of the RRNs) a channel report to the baseband controller, which may include information regarding the distorted signals $s'_0$, $s'_1$, and $s'_2$. For instance, the channel report may include a description of RF waveforms that correspond to the distorted signals $s'_0$, $s'_1$, and $s'_2$. Based on the channel report, the baseband controller may generate channel parameters for each RRN. The channel parameters may be used in subsequent communications, in order compensate for channel dispersion that may be caused by characteristics of channels between the RRNs and the user device.

For example, as shown in FIG. 1C, the baseband controller may output three modified versions $r'_0$, $r'_1$, and $r'_2$ of an original set of orthogonal analog signals $r_0$, $r_1$, and $r_2$. The three modified signals $r'_0$, $r'_1$, and $r'_2$ may each be generated based on signals $r_0$, $r_1$, or $r_2$, respectively, as well as the channel parameters generated by the baseband controller. For instance, using the channel parameters for a particular RRN, the baseband controller may "pre-distort" the signal sent via the particular RRN (e.g., by applying the inverse of a distortion observed in the channel report associated with the particular RRN). As further shown in FIG. 1C, the user device may receive the original signals $r_0$, $r_1$, and $r_2$, as the characteristics of the individual channels may have distorted each of the modified signals $r'_0$, $r'_1$, and $r'_2$ back into the original signals.

As described below, in addition to, or in lieu of, modifying signals outputted by RRNs, the baseband controller may modify traffic buffer parameters and/or encoding of traffic (e.g., may select audio and/or video codecs), based on channel characteristics. For example, if a particular channel exhibits excessive amounts of delay, the baseband controller may advance the timing of traffic, associated with the channel, in a traffic buffer. As another example, if a particular channel exhibits excessive signal loss, the baseband controller may modify a codec of traffic, associated with the channel, to a codec that utilizes a lower bitrate.

Figure 2:
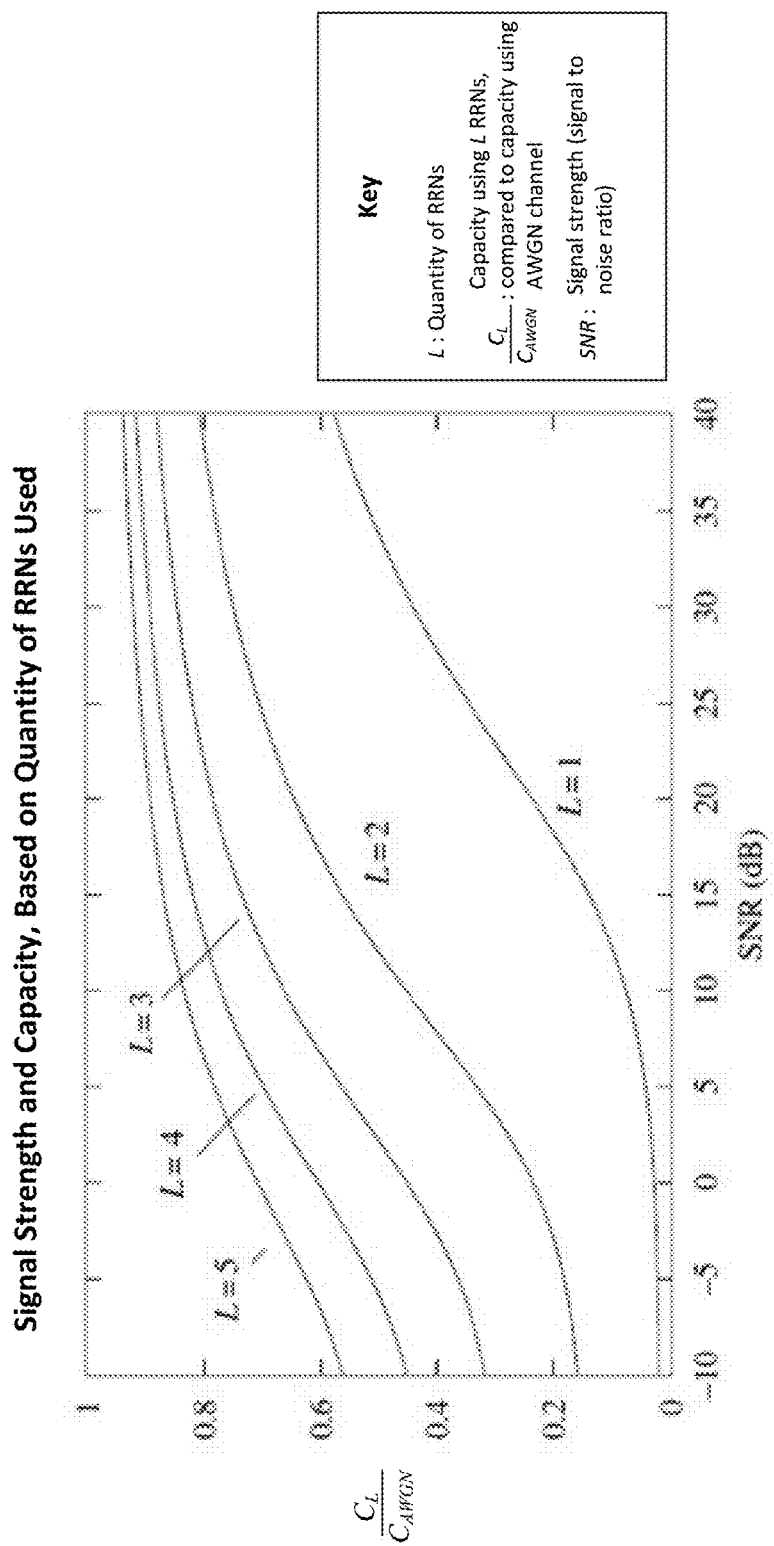
FIG. 2 illustrates an example illustrating the capacity of a quantity of RRNs in relation to signal strength.

FIG. 2 illustrates an example of the capacity of a quantity of RRNs in relation to signal strength. For example, as shown, using more RRNs (where L represents the quantity of RRNs) may provide relatively more effective RF capacity (expressed in terms of a ratio of effective capacity using L RRNs to effective capacity using a reference Additive White Gaussian Noise ("AWGN") channel) at a given signal to noise ratio ("SNR," expressed in terms of decibels ("dB")). Thus, using multiple RRNs may be desirable, in order to increase the robustness and effective throughput of a RAN. By reducing dispersion, as provided by some implementations, the robustness and effective throughput of a RAN, that includes multiple RRNs, may be further improved.

Additionally, using multiple RRNs may eliminate or reduce the need for handoffs between base stations, as a user device may be in communication with multiple RRNs at once. Further, since the baseband controller may generally control the operation of the RRNs, deploying upgrades and/or modifications to the operation of the RRNs may be simplified (e.g., by modifying hardware and/or software associated with the baseband controller, without the need to modify the RRNs).

Figure 3:
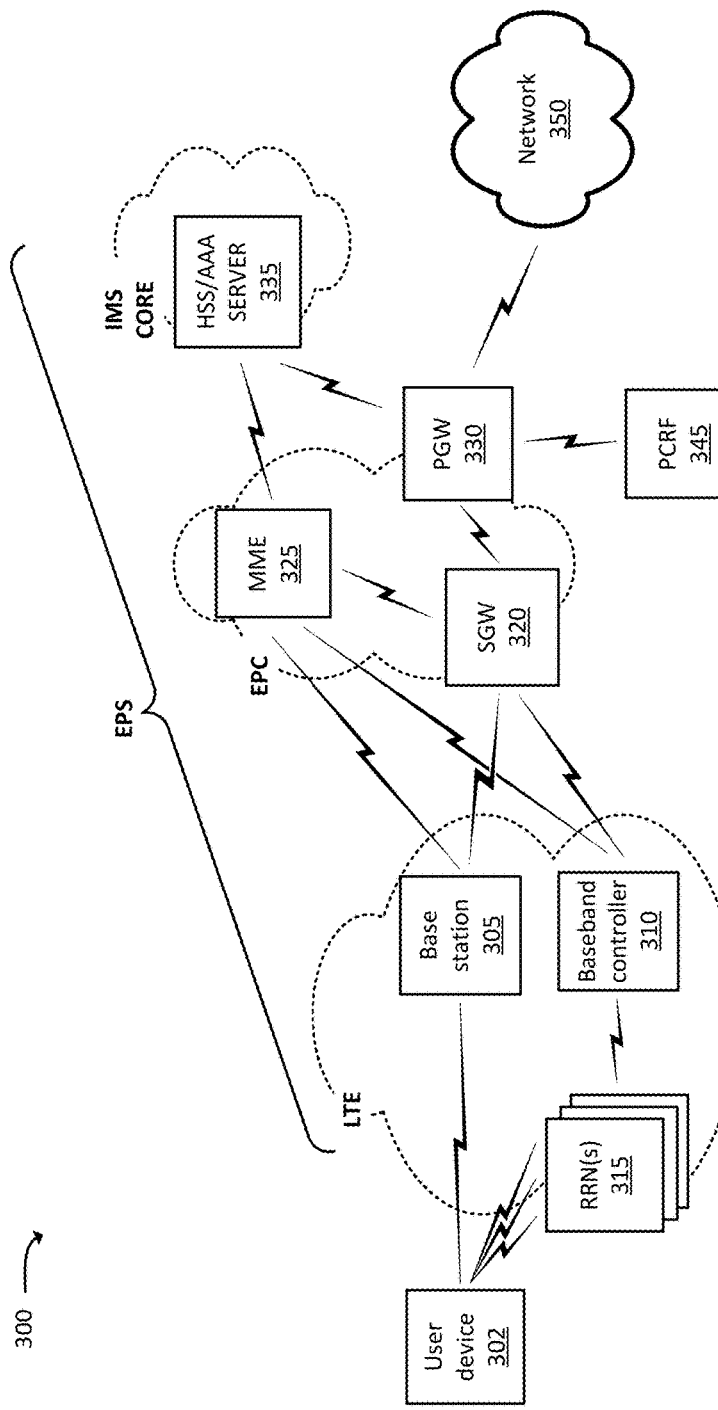
FIG. 3 illustrates an example environment, in accordance with one or more implementations.

FIG. 3 illustrates an example environment 300, in which systems and/or methods described herein may be implemented. As shown in FIG. 3, environment 300 may include user device 302, base station 305, baseband controller 310, a set of RRNs 315, serving gateway ("SGW") 320, mobility management entity device ("MME") 325, packet data network ("PDN") gateway ("PGW") 330, home subscriber server ("HSS")/authentication, authorization, accounting ("AAA") server 335 (hereinafter referred to as "HSS/AAA server 335"), policy charging and rules function ("PCRF") 345, service provider 350, and network 350.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a RAN that includes one or more base stations 305, some or all of which, may take the form of an evolved Node B ("eNB"), via which user device 302 may communicate with the EPC network. The RAN may additionally, or alternatively, include a set of RRNs 315, which may be communicatively coupled to baseband controller 310.

The EPC network may include one or more SGWs 320, MMEs 325, and/or PGWs 330, and may enable user device 302 to communicate with network 350 and/or an Internet protocol ("IP") multimedia subsystem ("IMS") core network. The IMS core network may include HSS/AAA server 335, and may manage authentication, session initiation, account information, a user profile, etc. associated with user device 302.

User device 302 may include any computation and communication device, such as a wireless mobile communication device that is capable of communicating with base station 305 and/or network 350 (e.g., via RRNs 315, in some situations). For example, user device 302 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 302 may send traffic to and/or receive traffic from network 350 via signal bearers, such as base station 305, baseband controller 310, RRN 315, SGW 320, and/or PGW 330.

In some implementations, user device 302 may be a device with MIMO capabilities. For example, user device 302 may include a set of radio transceivers, via which radio channels may be simultaneously established with multiple remote devices (e.g., multiple RRNs 315). In some implementations, user device 302 may include logic and/or circuitry to decode multiple physical RF signals (e.g., RF signals received via each radio transceiver) as single logical channel.

Base station 305 may include one or more network devices that receive, process, and/or transmit traffic, such as calls, audio, video, text, and/or other data, destined for and/or received from user device 302. In one example, base station 305 may be an eNB device and may be part of the LTE network. Additionally, or alternatively, one or more other base stations 305 may be associated with a RAN that is not associated with the LTE network (e.g., a wireless hot spot, a wireless access point, etc.). Base station 305 may receive traffic from and/or send traffic to network 350 via SGW 320 and PGW 330. Base station 305 may send traffic to and/or receive traffic from user device 302 via an air interface.

Baseband controller 310 may include one or more devices that receive, process, and/or transmit traffic, such as calls, audio, video, text, and/or other data, destined for and/or received from user device 302. Baseband controller 310 may, for example, receive digital data from SGW 320, convert the data to analog signals, and output the analog signals to user device 302 via one or more RRNs 315. As described below, baseband controller 310 may modify analog signals, sent to one or more user devices 302, on a per-user device and per-RRN basis. Transmitting modified signals may alleviate dispersion, which may occur as a result of transmitting the same data via multiple RRNs 315.

RRN 315 may include one or more devices that communicate with user device 302 and with baseband controller 310. In this sense, RRN 315 may serve as an interface between baseband controller 310 and user device 302. For example, RRN 315 may forward data received from baseband controller 310 to user device 302, and/or may forward data received from user device 302 to baseband controller 310. RRN 315 may include one or more radio transceivers via which RRN 315 may wirelessly communicate with user device 302.

SGW 320 may include one or more network devices that gather, process, search, store, and/or provide information in a manner described herein. SGW 320 may, for example, aggregate traffic received from one or more base stations 305 and/or baseband controller 310 and may send the aggregated traffic to network 350 via PGW 330.

MME 325 may include one or more computation and communication devices that gather, process, search, store, and/or provide information in a manner described herein. For example, MME 325 may perform operations to register user device 302 with the EPS, to establish bearer channels associated with a session with user device 302, to handoff user device 302 from the EPS to another network, to hand off user device 302 from the other network to the EPS, and/or to perform other operations. MME 325 may perform policing operations on traffic destined for and/or received from user device 302.

PGW 330 may include one or more network devices, or other types of computation and communication devices, that gather, process, search, store, and/or provide information in a manner described herein. PGW 330 may aggregate traffic received from one or more SGWs 320, etc. and may send the aggregated traffic to network 350. PGW 330 may also, or alternatively, receive traffic from network 350 and may send the traffic toward user device 302 via SGW 320 and/or base station 305.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 302 and/or one or more other user devices 302. Additionally, or alternatively, HSS/AAA server 335 may perform authentication, authorization, and/or accounting operations associated with the subscriber and/or a communication session with user device 302.

PCRF 345 may include one or more server devices, or other types of devices, that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 350 may include one or more wired and/or wireless networks. For example, network 350 may include a packet data network ("PDN"), such as an Internet Protocol ("IP")-based PDN. Network 350 may include, for example, a wide area network ("WAN") such as the Internet, and/or one or more other networks. User device 302 may connect, through PGW 330, to data servers, application servers, or to other servers/applications that are coupled to network 350.

Figure 4:
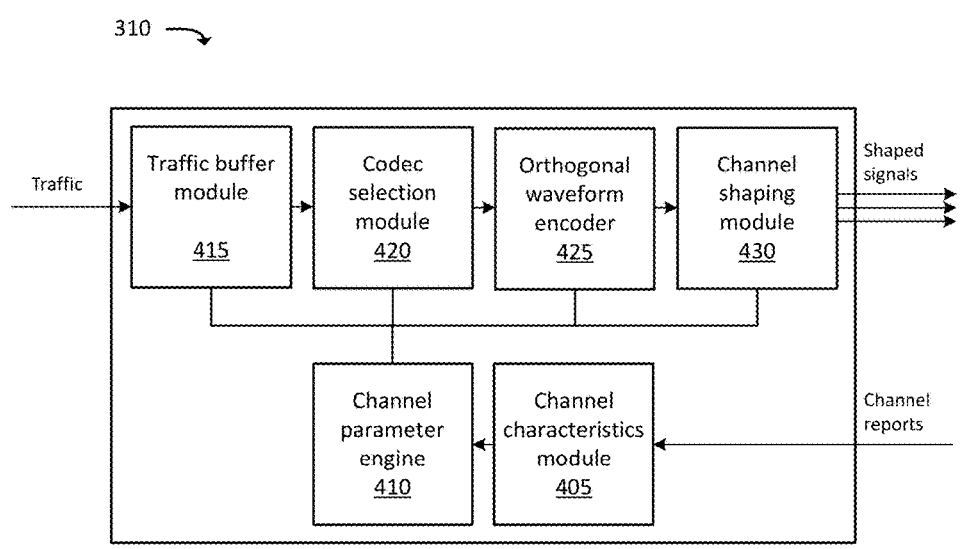
FIG. 4 illustrates example functional components of a baseband controller.

FIG. 4 illustrates example functional components of baseband controller 310, in accordance with some implementations. As shown, baseband controller 310 may include channel characteristics module 405, channel parameter engine 410, traffic buffer module 415, codec selection module 420, orthogonal waveform encoder 425, channel shaping module 430. In some implementations, baseband controller 310 may include additional, fewer, different, and/or differently arranged components. In some implementations, the functionality described below with regard to one component may be performed in whole or in part by one or more other components.

Channel characteristics module 405 may receive channel report information from user device 302, which may be used to determine characteristics of channels between RRNs 315 and user device 302. For instance, channel characteristics module 405 and/or another device (e.g., a device other than baseband controller 310) may output a test signal to user device 302, via multiple RRNs 315. As mentioned above, each version of the test signal, received by user device 302, may be different from the other versions of the test signal (e.g., signals received from one RRN 315 may be different from test signals received from other RRNs 315), due to the differences in characteristics of channels between RRNs 315 and user device 302. For instance, one version of the test signal may be weaker (e.g., may exhibit a lower SNR) than other versions of the test signal or with respect to the original test signal, may be more lossy than other versions of the test signal or with respect to the original test signal, may be delayed with respect to other versions of the test signal or with respect to the original test signal, and/or may include other types of errors or measureable phenomena. User device 302 may store information regarding the received test signal (e.g., may record information regarding waveforms that correspond to the different versions of the test signal, along with information relating the waveforms to RRNs 315 from which the versions of the test signal were received), and may provide the information to channel characteristics module 405 ("Channel reports").

Channel parameter engine 410 may receive the channel reports from channel characteristics module 405, and may generate channel parameters based on the channel reports. The channel parameters may be generated on a per-RRN and a per-user device basis, in order to account for the channel characteristics reflected in the channel reports. In order to generate the channel parameters, channel parameter engine 410 may compare the received channel reports to the originally sent test signal. For example, if the channel report indicates that a waveform, corresponding to a test signal sent via a particular RRN 315, includes excessive noise when compared with the original test signal, the channel parameters may be generated to compensate for the excessive noise.

The channel parameters may include traffic buffer parameters, codec selection parameters, and/or channel shaping parameters, and may be provided to traffic buffer module 415, codec selection module 420, and/or channel shaping module 430, respectively. Providing the respective parameters to modules 415, 420, and/or 430 may cause these modules to modify traffic in a manner that may compensate for characteristics of channels between RRNs 315 and user device 302.

Traffic buffer module 415 may store traffic, destined for user device 302, that is received from an external source (e.g., from SGW 320). Traffic buffer module 415 may include one or more queues, which may dictate an order in which the traffic is outputted toward user device 302. For example, channel parameter engine 410 may generate traffic buffer parameters, based on which traffic buffer module 415 may prioritize traffic for outputting.

Figure 5:
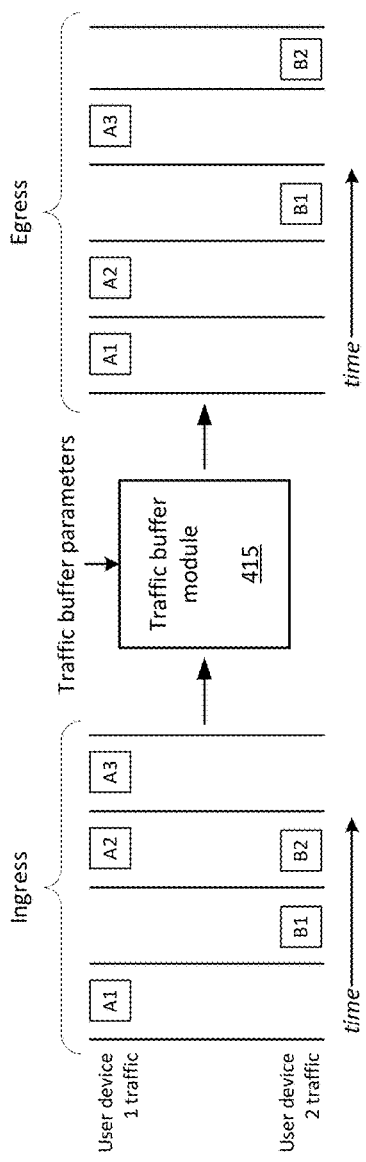
FIGS. 5-7 conceptually illustrate example functionality of some components of a baseband controller.

FIG. 5 conceptually illustrates an example situation in which traffic buffer module 415 may prioritize data, associated with one user device 302, over data associated another user device 302 based on traffic buffer parameters. For instance, as shown, assume that traffic is received (e.g., from SGW 320 and/or from another device) in the following order: A1, B1, A2 and B2 at approximately the same time, and A3, where A1-A3 represent data packets intended for a first user device ("User device 1"), and B1 and B2 represent data packets intended for a second user device ("User device 2"). Further assume that traffic buffer module 415 determines that data packets A1-A3 correspond to "time-sensitive," or "real-time" data (e.g., voice call data, data with a relatively high Quality of Service ("QoS") Class Identifier ("QCI"), etc.). For instance, traffic buffer module 415 may make such a determination based on analyzing header information and/or other information associated with data packets A1-A3. Further assume that the traffic buffer parameters indicate that a set of channels, associated with RRNs 315 and User device 1, exhibit excessive delay (e.g., RF signals, sent by one or more RRNs 315, arrive at User device 1 slower than a threshold amount of time). Traffic buffer module 415 may prioritize the data packets associated with User device 1, in order to compensate for the excessive delay. For instance, as shown, traffic buffer module 415 may place the data packets in an egress buffer in the following order: A1, A2, B1, A3, and B2.

Figure 6:
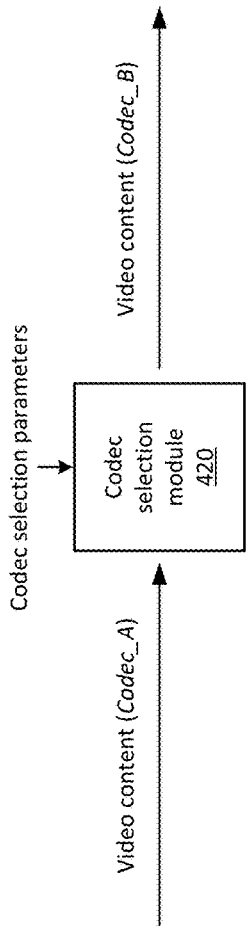

Returning to FIG. 4, codec selection module 420 may select and/or modify codecs, associated with traffic to be outputted toward user device 302. For example, the traffic received by baseband controller 310 may include audio content, video content, and/or other content, which may be encoded with one or more codecs (e.g., a Moving Picture Experts Group ("MPEG") codec, a Free Lossless Audio Codec ("FLAC"), and/or another codec). Based on codec selection parameters, received from channel parameter engine 410, traffic buffer module 415 may apply a codec to content destined for user device 302, may remove a codec from the content, and/or may replace one or more codecs with one or more other codecs. Traffic buffer module 415 may select a codec based on information provided in the codec selection parameters, which may indicate a maximum bitrate, a preferred codec, and/or other parameters. For example, as shown in FIG. 6, codec selection module 420 may receive video content, encoded with a first codec ("Codec_A"). Based on codec selection parameters, codec selection module 420 may select a second codec ("Codec_B"), which may be, for example, a different codec and/or a lower bitrate version of the first codec.

The codec selection parameters may be generated by channel parameter engine 410 based on channel reports that indicate, for instance, that a particular channel, or set of channels, associated with user device 302, is relatively lossy (e.g., a threshold proportion of data packets, such as test packets, are lost when sending the data packets to user device 302). For instance, when a particular channel (or set of channels), associated with user device 302, is lossy, the codec selection parameters may indicate that a maximum bitrate should be used for traffic sent to user device 302. The maximum bitrate may, in some implementations, be selected based on how lossy the channel (or set of channels) is. As another example, the codec selection parameters may indicate a particular codec (or set of codecs) that should be used for traffic sent to user device 302, which may be selected based on how lossy the channel (or set of channels) is.

Returning to FIG. 4, orthogonal waveform encoder 425 may generate a set of orthogonal waveforms, based on data (e.g., digital data) that corresponds to traffic received by baseband controller 310. For instance, orthogonal waveform encoder 425 may receive the digital data, and may generate a modulated signal based on the digital data. In order to generate the modulated signal, orthogonal waveform encoder 425 may perform one or more other operations on the digital data stream, such as interleaving, serial-to-parallel conversion, inverse Fourier filter transformation ("IFFT") operations, and/or demultiplexing operations. In some implementations, the quantity of orthogonal waveforms, generated by orthogonal waveform encoder 425 for a particular user device 302, may be based on a quantity of RRNs 315 present in a RAN, a quantity of RRNs 315 in communication with user device 302, a predetermined quantity, and/or some other quantity.

Channel shaping module 430 may shape signals (e.g., orthogonal waveforms generated by orthogonal waveform encoder 425), destined for user device 302, based on channel shaping parameters received from channel parameter engine 410. For example, channel shaping module 430 may adjust the orthogonal waveforms to compensate for channel characteristics, as indicated by the channel shaping parameters.

Figure 7:
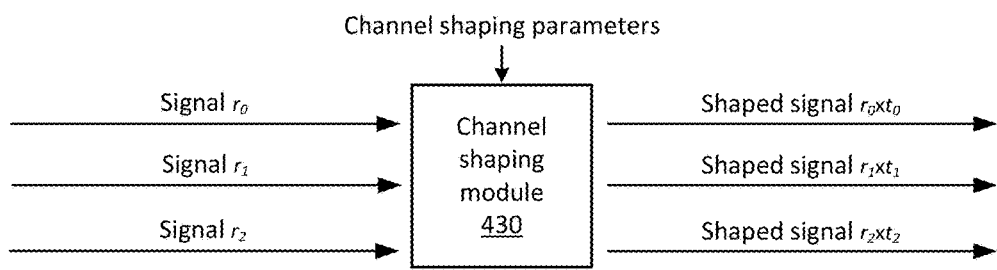

As shown in FIG. 7, for instance, assume that channel shaping module 430 receives three orthogonal signals $r_0$, $r_1$, and $r_2$ for a particular user device 302. Channel shaping module 430 may apply three different transformations $t_0$, $t_1$, and $t_2$ to the signals, respectively, thus yielding three orthogonal shaped signals $r_0 \times t_0$, $r_1 \times t_1$, and $r_2 \times t_2$.

The channel shaping parameters, generated by codec selection module 420, may, in one example implementation, be based on a mean square error estimation performed based on a difference between a test signal and a received signal (e.g., a difference between test signals provided by channel characteristics module 405 and information provided in channel reports). The channel shaping parameters may compensate for transmission errors, such as delay errors, random errors, signal loss errors, and/or other errors that may be caused by characteristics of channels between RRNs 315 and user device 302.

Figure 8:
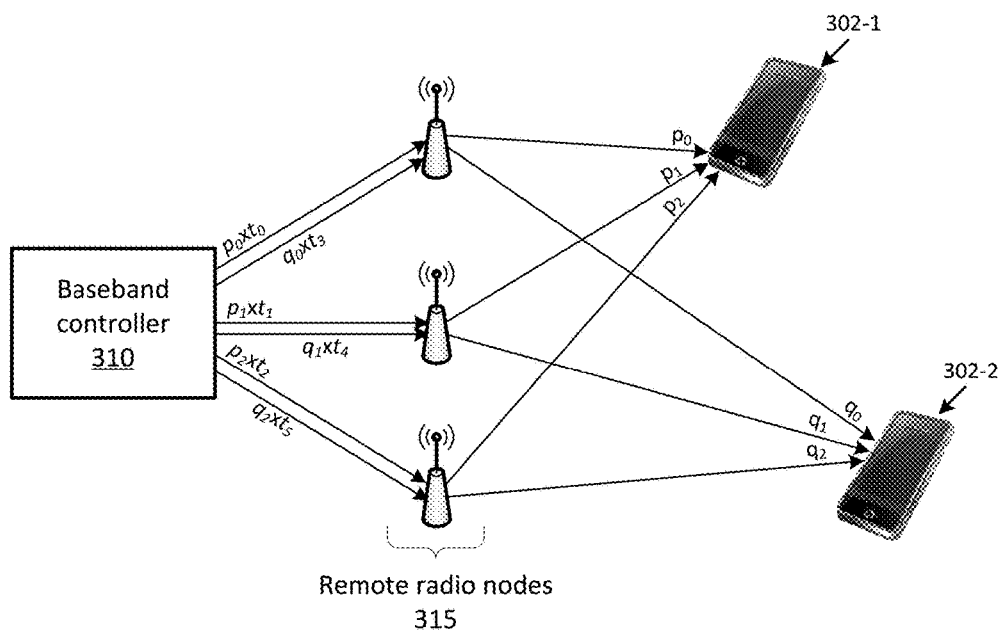
FIG. 8 conceptually illustrates the modification of traffic for multiple user devices, on a per-user device and a per-RRN basis.

While described in the context of one user device 302, similar concepts may apply for multiple user devices 302. For instance, as shown in FIG. 8, baseband controller 310 may communicate with user devices 302-1 and 302-2 via a set of three RRNs 315. Orthogonal waveform encoder 425 may have generated three orthogonal signals $p_0$, $p_1$, and $p_3$ to be outputted to user device 302-1, and another three orthogonal signals $q_0$, $q_1$, and $q_2$ to be outputted to user device 302-2. Channel shaping module 430 may have applied six different transforms $t_0$, $t_1$, $t_2$, $t_3$, $t_4$, and $t_5$ to the signals, in order to yield three transformed signals $p_0 \times t_0$, $p_1 \times t_1$, and $p_2 \times t_2$ for user device 302-1, and three transformed signals $q_0 \times t_3$, $q_1 \times t_4$, and $q_2 \times t_5$ for user device 302-2. Baseband controller 310 may output the transformed signals, via RRNs 315, to the respective user devices 302-1 and 302-2. Due the characteristics of the individual channels between RRNs 315 and user devices 302-1 and 302-2, non-transformed versions of orthogonal signals $p_0$, $p_1$, and $p_3$ may be received by user device 302-1, and non-transformed versions of orthogonal signals $q_0$, $q_1$, and $q_2$ to may be received by user device 302-2. Logic and/or circuitry associated with user devices 302-1 and 302-2 (e.g., MIMO logic and/or circuitry) may decode the orthogonal signals (e.g., by performing an FFT operation, a multiplexing operation, an analog-to-digital conversion operation, etc.) into usable data.

Figure 9:
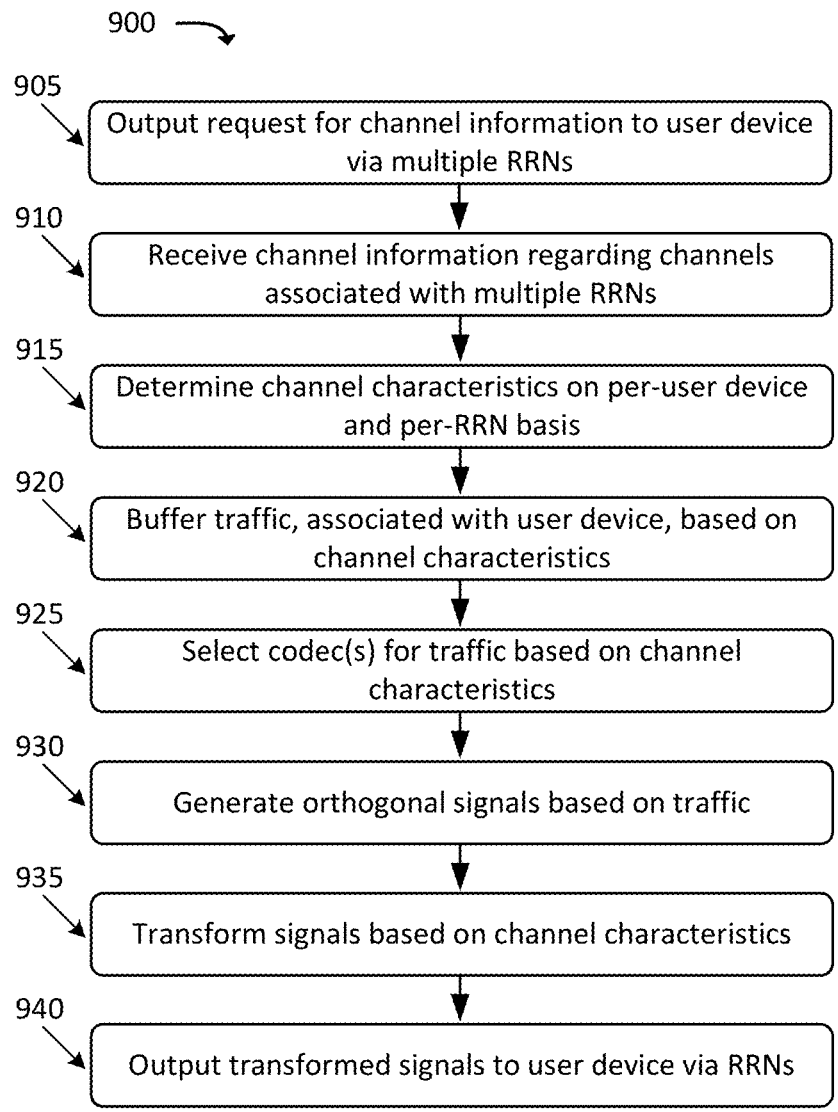
FIG. 9 illustrates an example process for modifying traffic on a per-user device and a per-RRN basis, based on characteristics of channels associated with RRNs of a RAN.

FIG. 9 illustrates an example process 900 for modifying traffic on a per-user device and a per-RRN basis, based on characteristics of channels associated with RRNs of a RAN. In some implementations, process 900 may be performed by baseband controller 310. In other implementations, some or all of process 900 may be performed by one or more other devices in addition to, or in lieu of, baseband controller 310.

Process 900 may include outputting a request for channel information to a user device via multiple RRNs (block 905). For example, as described above with respect to channel characteristics module 405, baseband controller 310 may output a test signal to a particular user device user device 302 via a set of RRNs 315. The test signal may be, for example, a series of continuous signals (e.g., lasting for a fraction of a second, lasting more than one second, etc.). As mentioned above, some or all of the signals received by user device 302 may be distorted due to characteristics of individual channels between user device 302 and each RRN 315. For instance, one or more of the signals may be weakened, delayed, include random errors, and/or may exhibit other types of phenomena. As such, the test signals, received by user device 302, may be different from the test signals sent by baseband controller 310. User device 302 may output one or more channel reports, which may include information regarding the test signals as received (e.g., may include a description, such as a graph and/or raw data, of waveforms corresponding to the test signals).

Process 900 may also include receiving channel information regarding channels associated with the user device and the multiple RRNs (block 910). For example, baseband controller 310 may receive the channel reports from user device 302, which may describe test signals received from baseband controller 310.

Process 900 may further include determining channel characteristics on a per-user device and per-RRN basis (block 915). For example, as described above with respect to channel parameter engine 410, baseband controller 310 may compare the test signals, as received by user device 302, to the test signals that were originally sent to user device 302. Baseband controller 310 may perform a mean square error estimation and/or another technique in order to determine a difference between the test signals, as received, and the original test signals. Baseband controller 310 may determine, for example, types of transmission errors that occurred, such as delay errors, random errors, signal loss errors, and/or other errors that may be caused by characteristics of channels between RRNs 315 and user device 302.

Process 900 may additionally include buffering traffic, associated with the user device, based on the channel characteristics (block 920). For example, as described above with respect to traffic buffer module 415, baseband controller 310 may buffer traffic for user device 302 and/or other user devices 302, based on channel characteristics of channels between RRNs 315 and user devices 302. For example, if a particular data stream, associated with user device 302 is a "real-time" or a "time-sensitive" data stream (e.g., a data stream corresponding to a voice call, a data stream with a relatively high QCI, etc.), and one or more channels between RRNs 315 and user device 302 exhibit delay, baseband controller 310 may elevate a priority associated with the data stream. Baseband controller 310 may, for instance, prioritize the data stream over data streams associated with other user devices 302, and/or over other data streams associated with user device 302.

Process 900 may also include selecting one or more codecs for the traffic based on the channel characteristics (block 925). For example, as described above with respect to codec selection module 420, baseband controller 310 may identify a type of content associated with the traffic, and/or a type of codec associated with the traffic. For instance, codec selection module 420 may inspect header information (e.g., an Internet Protocol ("IP") header, and/or other information associated with the traffic, in order to determine the type of traffic and/or a codec associated with the traffic. Baseband controller 310 may determine whether an existing codec should be removed or replaced, and/or whether a different codec should be applied to the traffic, based on the determined channel characteristics.

For example, assume that a particular channel, or set of channels, exhibits excessive RF noise (e.g., SNR is above a threshold SNR). Baseband controller 310 may select a particular codec, having a bitrate that corresponds to the noise of the channel or set of channels. For instance, baseband controller 310 may lower the bitrate of an existing codec, and/or choose a different codec with a lower bitrate than an existing codec. Additionally, or alternatively, baseband controller 310 may choose a more robust codec (e.g., a codec that is designed to accommodate for poor transmission quality).

Process 900 may further include generating a set of orthogonal signals based on the traffic (block 930). For example, as described above with respect to orthogonal waveform encoder 425, baseband controller 310 may generate an orthogonal set of signals, based on the traffic to be sent to user device 302. The quantity of signals may correspond to a quantity of RRNs 315 with which user device 302 is in communication, a quantity of RRNs 315 with which baseband controller 310 is in communication, and/or some other quantity.

Process 900 may additionally include transforming the signals based on the channel characteristics (block 935). For example, as described above with respect to channel shaping module 430, baseband controller 310 may shape individual signals based on characteristics of individual channels between RRNs 315 and user device 302. The shaping may accommodate for transmission errors and/or other phenomena that occur as a result of transmitting the signals via each RRN 315 to user device 302. For example, a different transform may be applied to each signal, which may be an inverse of a transform that occurs as a result of transmitting the signal to user device 302 via each RRN 315.

Process 900 may also include outputting the transformed signals to the user device via the RRNs (block 940). For example, baseband controller 310 may provide each transformed signal to a respective RRN 315. Each RRN 315 may output, via an air interface, a respective transformed signal to user device 302. User device 302 may receive the multiple signals, which may have transformed back to the original signals generated by baseband controller 310 (e.g., at block 930). As mentioned above, user device 302 may include circuitry and/or logic (e.g., MIMO circuitry and/or logic), which may allow user device 302 to decode the multiple signals as a single logical data channel.

Some or all of process 900 may be performed for multiple user devices 302 (e.g., in a manner similar to that described above with respect to FIG. 8). In some implementations, some or all of process 900 may be repeatedly and/or iteratively performed on a periodic and/or intermittent basis. For example, baseband controller 310 may periodically and/or intermittently receive channel information (at block 910) from a particular user device 302, and may periodically and/or intermittently determine (at block 915) channel characteristics, on a per-RRN basis, for the particular user device 302. Subsequent or iterative operations at blocks 920-940 may be performed based on the repeatedly and/or iteratively determined channel characteristics. In this manner, baseband controller 310 may accommodate for ever-changing conditions, such as user device 302 physically moving closer to and/or away from one or more RRNs 315, network load and/or congestion, temporary RF interference sources, and/or other conditions.

Figure 10:
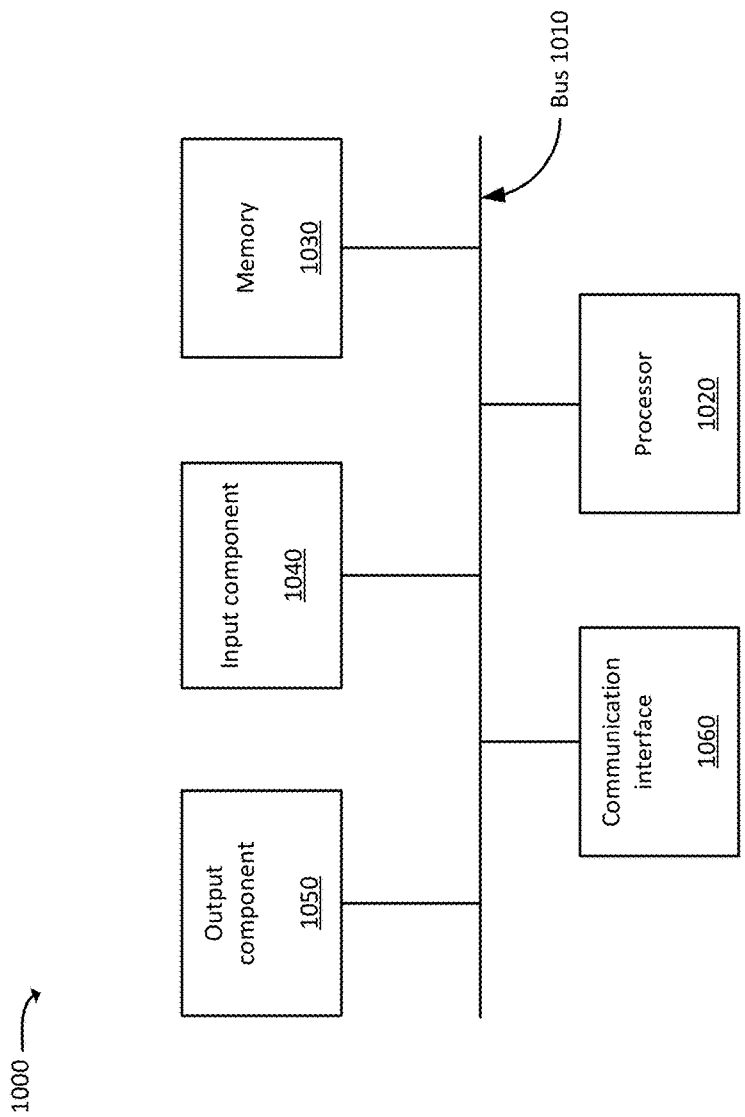
FIG. 10 illustrates example components of one or more devices, according to one or more implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 9, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   outputting, by one or more devices and via a plurality of remote radio nodes ("RRNs"), a first set of signals to a user device;
   receiving, by the one or more devices, report information regarding a second set of signals received by the user device, the second set of signals being distorted versions of the first set of signals;
   comparing, by the one or more devices and based on the report information, the first set of signals, outputted to the user device, and the second set of signals, received by the user device, the comparing including:
      comparing a particular first signal, in the first set of signals, that was outputted via a particular RRN of the plurality of RRNs, to a particular second signal, in the second set of signals, the second signal being a distorted version of the first signal, to determine a difference, between the first signal and the second signal, that has occurred due at least in part to dispersion of the first signal,
      the second signal having been received by the user device from the same particular RRN;
   determining, by the one or more devices and based on the comparison of the first set of signals to the second set of signals, channel characteristics of a plurality of channels,
      the determining being further based on differences between each signal, in the first set of signals, to a corresponding signal, in the second set of signals,
      each channel, of the plurality of channels, being a channel between one RRN, of the plurality of RRNs, and the user device;
   selecting, by the one or more devices and based on the channel characteristics, at least one of an audio codec or a video codec;
   applying, by the one or more devices, the selected audio codec or video codec to first traffic, destined for the user device, wherein the first traffic includes audio or video content;
   buffering the first traffic, destined for the user device, and second traffic, destined for another user device, in an order that is based on the channel characteristics;

shaping, by the one or more devices and based on the channel characteristics, a third set of signals that correspond to the first traffic destined for the user device,
  each signal, of the third set of shaped signals, corresponding to a different RRN, of the plurality of RRNS,
  the shaping including transforming each signal, of the third set of signals, based on the channel characteristics of the particular channel associated with the RRN with which the signal corresponds; and
outputting, by the one or more devices, the first traffic and the second traffic according to the order in which the first traffic and the second traffic were buffered,
  wherein outputting the first traffic includes outputting the third set of signals to the user device via the plurality of RRNs.

2. The method of claim 1, wherein determining the difference, between the first signal and the second signal, includes performing a mean error estimation operation.

3. The method of claim 1, wherein the user device is a first user device, and wherein the other user device is a second user device, wherein the buffering includes:
  receiving the first traffic and second traffic in a first order,
  modifying a priority of the first traffic or the second traffic, based on the channel characteristics, and
  placing, based on the modified priority of the first traffic or the second traffic, portions of the first traffic and the second traffic in an egress buffer in a second order that is different from the first order,
  wherein outputting the first traffic and the second traffic includes outputting the first traffic and the second traffic from the egress buffer in the second order.

4. The method of claim 1, wherein the signals, of the third set of signals, are orthogonal with respect to each other.

5. The method of claim 1, wherein the channel characteristics indicate a measure of noise in the second signal, as compared to the first signal, wherein selecting the at least one of the audio codec or the video codec includes:
  selecting the at least one of the audio codec or the video codec based on:
    the measure of noise indicated, in the channel characteristics, between the first signal and the second signal, and
    a bitrate of the at least one of the audio codec or the video codec.

6. The method of claim 1, wherein the distortion of the signals, of the second set of signals occur as a result of transmitting the first set of signals to the user device via the plurality of RRNs.

7. The method of claim 1, wherein determining the channel characteristics, for a particular channel, includes determining a type of transmission error associated with the particular channel.

8. A system, comprising:
  a memory device storing a set of processor-executable instructions; and
  a processor configured to execute the processor-executable instructions, wherein executing the computer-executable instructions causes the processor to:
    output, via a plurality of remote radio nodes ("RRNs"), a first set of signals to a user device;
    receive report information regarding a second set of signals received by the user device,
      the second set of signals being distorted versions of the first set of signals;
    compare, based on the report information, the first set of signals, outputted to the user device, and the second set of signals, received by the user device, the comparison including:
      a comparison of a particular first signal, in the first set of signals, to a particular second signal, in the second set of signals, the second signal being a distorted version of the first signal, to determine a difference between the first signal and the second signal, that has occurred due at least in part to dispersion of the first signal while the first signal,
      the first signal having been outputted via a particular RRN, of the plurality of RRNs, and
      the second signal having been received by the user device from the particular RRN;
    determine, based on the comparison of the first set of signals to the second set of signals, channel characteristics of a plurality of channels,
      the determination being further based on differences between each signal, in the first set of signals, to a corresponding signal, in the second set of signals,
      each channel, of the plurality of channels, being a channel between one RRN, of the plurality of RRNs, and the user device;
    select, based on the channel characteristics, at least one of an audio codec or a video codec;
    apply the selected audio codec or video codec to first traffic, destined for the user device, wherein the first traffic includes audio or video content;
    buffer the first traffic, destined for the user device, and second traffic, destined for another user device, in an order that is based on the channel characteristics;
    shape, by the one or more devices and based on the channel characteristics, a third set of signals that correspond to the first traffic destined for the user device,
      each signal, of the third set of shaped signals, corresponding to a different RRN,
      the shaping including transforming each signal, of the third set of signals, based on the channel characteristics of the particular channel associated with the particular RRN with which the signal corresponds; and
    output, by the one or more devices and via the plurality of RRNs, the first traffic and the second traffic according to the order in which the first traffic and the second traffic were buffered,
      wherein outputting the first traffic includes outputting the third set of signals.

9. The system of claim 8, wherein the user device is a first user device, and wherein the other user device is a second user device, wherein executing the processor-executable instructions, to buffer the first traffic and the second traffic, further causes the processor to:
  place the first traffic and the second traffic in an egress buffer in a first order that is different from a second order in which the first and second traffic are received from an external source,
  wherein executing the processor-executable instructions, to output the first traffic and the second traffic, further causes the processor to:
    output the first traffic and the second traffic from the egress buffer in the first order.

10. The system of claim 8, wherein the signals, of the third set of signals, are orthogonal with respect to each other.

11. The system of claim 8, wherein the channel characteristics indicate a measure of noise in the second signal, as compared to the first signal, wherein executing the processor-executable instructions, to select the at least one of the audio codec or the video codec, further causes the processor to:
    select the at least one of the audio codec or the video codec, based on:
        the measure of noise, indicated in the channel characteristics, and
        a bitrate of the at least one of the audio codec or the video codec.

12. The system of claim 8, wherein the signals, of the second set of signals, include transformed versions of the signals of the first set of signals, the transformations occurring as a result of transmitting the first set of signals to the user device via the plurality of RRNs.

13. The system of claim 8, wherein determining the channel characteristics, for a particular channel, includes determining a type of transmission error associated with the particular channel.

14. The method of claim 7, wherein determining the type of transmission error includes determining at least one of:
    a signal loss error in the second signal, with respect to the first signal,
    a delay error in the second signal, with respect to the first signal, or
    a random error in the second signal, with respect to the first signal.

15. The method of claim 7, wherein the type of transmission error includes a delay error, the method further including:
    determining a time sensitivity of the traffic destined for the user device; and
    modifying a priority of the traffic based on:
        the determined time sensitivity of the traffic, and
        the delay error.

16. The method of claim 1, wherein outputting the first traffic and the second traffic according to the order in which the first traffic and the second traffic were buffered includes:
    outputting the first traffic and the second traffic to an orthogonal waveform encoder that performs the shaping based on the channel characteristics.

17. The method of claim 1, wherein the first traffic includes video content encoded with a first codec, the method further comprising:
    selecting a different second codec based on the channel characteristics; and
    applying the second codec to the first traffic before outputting the first traffic.

18. A non-transitory computer-readable medium storing a set of processor-executable instructions, which, when executed by one or more processors, cause the one or more processors to:
    output, via a plurality of remote radio nodes ("RRNs"), a first set of signals to a user device;
    receive report information regarding a second set of signals received by the user device,
        the second set of signals being distorted versions of the first set of signals;
    compare, based on the report information, the first set of signals, outputted to the user device, and the second set of signals, received by the user device, the comparison including:
        a comparison of a particular first signal, in the first set of signals, to a particular second signal, in the second set of signals, the second signal being a distorted version of the first signal, to determine a difference between the first signal and the second signal, that has occurred due at least in part to dispersion of the first signal while the first signal,
        the first signal having been outputted via a particular RRN, of the plurality of RRNs, and
        the second signal having been received by the user device from the particular RRN;
    determine, based on the comparison of the first set of signals to the second set of signals, channel characteristics of a plurality of channels,
        the determination being further based on differences between each signal, in the first set of signals, to a corresponding signal, in the second set of signals,
        each channel, of the plurality of channels, being a channel between one RRN, of the plurality of RRNs, and the user device;
    select, based on the channel characteristics, at least one of an audio codec or a video codec;
    apply the selected audio codec or video codec to first traffic, destined for the user device, wherein the first traffic includes audio or video content;
    buffer the first traffic, destined for the user device, and second traffic, destined for another user device, in an order that is based on the channel characteristics;
    shape, by the one or more devices and based on the channel characteristics, a third set of signals that correspond to the first traffic destined for the user device,
        each signal, of the third set of shaped signals, corresponding to a different RRN,
        the shaping including transforming each signal, of the third set of signals, based on the channel characteristics of the particular channel associated with the particular RRN with which the signal corresponds; and
    output, by the one or more devices and via the plurality of RRNs, the first traffic and the second traffic according to the order in which the first traffic and the second traffic were buffered,
        wherein outputting the first traffic includes outputting the third set of signals.

19. The non-transitory computer-readable medium of claim 18, wherein the processor-executable instructions, to output the first traffic and the second traffic according to the order in which the first traffic and the second traffic were buffered, include processor-executable instructions to:
    output the first traffic and the second traffic to an orthogonal waveform encoder that performs the shaping based on the channel characteristics.

20. The non-transitory computer-readable medium of claim 18, wherein the first traffic includes video content encoded with a first codec, wherein the processor-executable instructions further include processor-executable instructions to:
    select a different second codec based on the channel characteristics; and
    apply the second codec to the first traffic before outputting the first traffic.

* * * * *